(12) United States Patent
Koo

(10) Patent No.: US 10,456,958 B2
(45) Date of Patent: Oct. 29, 2019

(54) METHOD FOR PRODUCING SYNTHETIC LEATHER AND SYNTHETIC LEATHER PRODUCED BY THE SAME

(71) Applicant: Soon Kie Jung, Glen Saddle River, NJ (US)

(72) Inventor: Ja Yun Koo, Yangju-si (KR)

(73) Assignee: Soon Kie Jung, Glen Saddle, NJ (US)

( * ) Notice: Subject to any disclaimer, the term of this patent is extended or adjusted under 35 U.S.C. 154(b) by 114 days.

(21) Appl. No.: 15/095,652

(22) Filed: Apr. 11, 2016

(65) Prior Publication Data

US 2017/0291331 A1 Oct. 12, 2017

(51) Int. Cl.

| | | |
|---|---|---|
| B29C 41/30 | (2006.01) | |
| B32B 25/20 | (2006.01) | |
| B32B 37/15 | (2006.01) | |
| B32B 5/02 | (2006.01) | |
| B32B 25/04 | (2006.01) | |
| B29K 83/00 | (2006.01) | |
| B29L 9/00 | (2006.01) | |
| D04H 1/64 | (2012.01) | |
| B32B 37/26 | (2006.01) | |
| B32B 25/10 | (2006.01) | |
| B32B 38/10 | (2006.01) | |

(52) U.S. Cl.
CPC ............. B29C 41/30 (2013.01); B32B 5/024 (2013.01); B32B 25/042 (2013.01); B32B 25/20 (2013.01); B32B 37/15 (2013.01); B29K 2083/005 (2013.01); B29L 2009/005 (2013.01); B32B 25/10 (2013.01); B32B 37/26 (2013.01); B32B 38/10 (2013.01); B32B 2037/268 (2013.01); D04H 1/64 (2013.01); D06N 2209/143 (2013.01); D06N 2209/146 (2013.01); Y10T 442/2041 (2015.04)

(58) Field of Classification Search
CPC ............. B29C 41/30; B29K 2083/005; B29L 2009/005; B05D 7/12; C14C 13/00; C14C 11/00; B32B 9/025; B32B 2037/268; B32B 2250/03; B32B 2262/0269; B32B 2479/00; B32B 25/042; B32B 25/10; B32B 25/20; B32B 2605/003; B32B 37/15; B32B 37/26; B32B 38/10; B32B 5/024; D06N 7/00; D06N 2209/067; D06N 2209/143; D06N 2209/146; D06N 2211/28; D06N 3/128; D04H 1/587; D04H 1/64; Y10T 442/2041
USPC .......... 427/389, 412; 428/473; 156/235, 239, 156/289
See application file for complete search history.

(56) References Cited

U.S. PATENT DOCUMENTS

| | | | | |
|---|---|---|---|---|
| 1,534,456 | A * | 4/1925 | McKinnon | ............. C14B 7/02 |
| | | | | 156/220 |
| 9,228,295 | B2 * | 1/2016 | Jung | ............. D06N 3/183 |
| 9,322,130 | B2 * | 4/2016 | Jung | ............. D06N 3/0063 |
| 9,925,752 | B2 * | 3/2018 | Kweon | ............. D06N 3/128 |
| 9,957,662 | B2 * | 5/2018 | Seong | ............. D06N 3/14 |
| 2003/0170469 | A1 * | 9/2003 | Ikuta | ............. B32B 25/08 |
| | | | | 428/447 |
| 2007/0231573 | A1 * | 10/2007 | Thatcher | ............. D02G 3/36 |
| | | | | 428/375 |
| 2015/0165745 | A1 * | 6/2015 | Kweon | ............. D04H 1/64 |
| | | | | 442/64 |

FOREIGN PATENT DOCUMENTS

| | | | | |
|---|---|---|---|---|
| DE | 29812075 U1 * | 11/1998 | ........... | C14C 11/006 |
| JP | 2010228413 A * | 10/2010 | ............ | B32B 27/10 |
| KR | 10-2003-0095872 A | 12/2003 | | |
| KR | 10-1381914 B1 | 4/2014 | | |

OTHER PUBLICATIONS

English translation of KR20030095872.*
English translation of KR20140011742.*
English translation of DE29812075.*
English translation of JP2010228413.*
English translation of DE60131060.*
Patent Family for U.S. Appl. No. 15/095,652.*
Patent Family for U.S. Appl. No. 14/124,521.*

* cited by examiner

*Primary Examiner* — Sonya M Sengupta
(74) *Attorney, Agent, or Firm* — Sughrue Mion, PLLC

(57) ABSTRACT

The present invention provides a method for producing synthetic leather using a silicone rubber coating liquid; and synthetic leather produced by the method.

6 Claims, No Drawings

METHOD FOR PRODUCING SYNTHETIC LEATHER AND SYNTHETIC LEATHER PRODUCED BY THE SAME

TECHNICAL FIELD

The present invention provides a method for producing synthetic leather using a silicone rubber coating, and synthetic leather produced by the method.

BACKGROUND

When producing synthetic leather, polyurethane and polyvinyl chloride have been mainly used as typical coating materials.

However, these polyurethane and/or polyvinyl chloride based synthetic leathers have environmental concerns. Polyurethane based product uses organic solvent such as DMF (dimethylformamide) or MEK (methyl ethyl ketone) during the production process, and traces of these solvents/DMF are remained in the final product. It also has performance concerns from temperature variations which causes flexibility issues, and from hydrolysis degradation absorbing moisture from the atmosphere. Accordingly, technologies of using a water-dispersible polyurethane, not containing organic solvent, have been developing, but there are difficulties in the processing, and hydrolysis degradation issue still remains.

Korean Patent Application Laid-Open No. 2003-0095872 discloses a method for producing synthetic leather using a liquid silicone rubber. But synthetic leather produced by this method has failed to satisfy the strict physical properties requirements such as flame retardancy or smoke density for an interior material of an aircraft or a ship, and has also failed to satisfy the adhesion strength required for products.

Korean Patent No. 1,381,914 discloses a method for producing synthetic leather using liquid silicone rubbers having different characteristics. However, the synthetic leather produced by this method has poor adhesion properties to the supporting backing cloth, and the surface durability of the product is not strong enough for heavy duty commercial applications, so there happened quality issues when processing the product to make commercial upholstery and in the actual use of the product in the field.

SUMMARY

The present invention has been made in an effort to provide a method for producing synthetic leather having high adhesion properties and durability as well as excellent physical properties for various uses; and the synthetic leather produced by the method.

An exemplary embodiment of the present invention provides a method for producing synthetic leather, the method including: (a) a first coating process of knife-coating a release paper with a first coating liquid including a first silicone rubber (LSR) having a viscosity of 100 Pa·s or more, an elongation of 300% or more, and a shore hardness (shore A) of 50 or more; (b) a second coating process of knife-coating the release paper coated with the first coating liquid, with a second coating liquid including a second silicone rubber (LSR) having a viscosity of 100 Pa·s or more, an elongation of 300% or more, and a shore hardness of less than 50; (c) a bonding process of bonding the release paper coated with the second coating liquid onto a fabric and drying the release paper to cure the release paper; and (d) a separation process of separating the release paper from the fabric bonded onto the release paper.

Another exemplary embodiment of the present invention further includes a surface treatment process of treating a surface of the fabric, from which the release paper is separated, with a silicone surface coating agent, after (c) the drying process.

Another exemplary embodiment of the present invention uses a fabric woven with one or more fibers selected from the group consisting of aramid fiber, oxidized polyacrylonitrile fiber, shrinkage fiber, spandex, polyester fiber, and nylon, in process (c).

Another exemplary embodiment of the present invention provides synthetic leather produced by any one of the methods as described above.

According to the present invention, it is possible to produce synthetic leather which is environmentally friendly because either plasticizer or a solvent is not used, is suitable for various uses with excellent ink/stain resistance, adhesion properties, and durability.

DETAILED DESCRIPTION

An exemplary embodiment of the present invention provides a method for producing synthetic leather, the method including: (a) a first coating process; (b) a second coating process; (c) a bonding process; and (d) a separation process. Hereinafter, the present invention will be described in detail for each step.

(1) First Coating Process (Release Paper Coating Process)

The first process is a knife-coating of a release paper with a first coating liquid.

To this end, a first coating liquid comprising a first silicone rubber having a viscosity of 100 Pa·s or more, an elongation of 300% or more, a shore hardness (shore A) of 50 or more is prepared.

The first silicone rubber used in an exemplary embodiment of the present invention is not particularly limited, but examples thereof include a dimethyl siloxane having a dimethylvinyl end group, a methylvinyl siloxane having a dimethylvinyl end group, a methylhydrogen siloxane having a dimethyl end group, and the like.

The first silicone rubber is basically a liquid rubber in which a vinyl group and a methylhydrogen group are cured by an addition reaction in the presence of a platinum catalyst. The addition-type liquid rubber as described above is used for the reason that a water-dispersible condensation type rubber generates byproducts such as hydrogen, water, alcohol, and acetic acid by the crosslinking agent used in the condensation reaction.

In order to improve heat resistance and flame retardancy, aluminum hydrate, titanium dioxide, silica, and the like may be further added to the first coating liquid.

As the first coating liquid used in a synthetic coating layer, a first silicone rubber having an elongation of 300% or less and a shore hardness of 50 or more has been conventionally used, but there have been problems in that adhesive property of a final product deteriorates, high durability is not excellent, and the like. However, an exemplary embodiment of the present invention solves these problems using a silicone rubber having a viscosity of 100 Ps·s or more, an elongation of 300% or more, and a shore hardness of 50 or more as the first coating liquid. The first coating liquid exhibits excellent viscosity and thus has elasticity, and has relatively high density and thus has excellent adhesive property.

And then, a first coating is performed by coating the first coating liquid onto a release paper. The coating method is not limited, but knife-coating is preferred in order to engrave a pattern.

After the first coating, a first curing and drying is performed in a chamber at 80 to 170° C. When the curing and drying temperature is too high, the release paper may be damaged, whereas when the curing and drying temperature is too low, it takes long time for the curing and drying. A release paper on which a first coating layer is formed by the first coating is produced. The first coating layer produced in the step serves as an outer skin of the synthetic leather.

(2) Second Coating Process (Binder Coating Process)

The second process is a coating of a second coating liquid onto the first coating layer of the release paper primarily coated.

To this end, the second coating liquid comprising a second silicone rubber (LSR) having a viscosity of 100 Pa·s or more, an elongation of 300% or more, a shore hardness of less than 50 is prepared. The second coating liquid may include a silicone rubber like the first coating liquid, but as described above, a silicone rubber having different shore hardness and viscosity needs to be used.

And then, a second coating is performed by coating the second coating liquid onto the release paper primarily coated. The coating method is not limited, but knife-coating is preferred in order to engrave a pattern. When the first knife-coating is performed, and then the second knife-coating is applied, a two-toned pattern may be engraved.

The first coating and the second coating process are separately performed in general, but may be performed in one continuous process.

(3) Fabric Bonding and Release Paper Separation Processes

In the next process, the release paper coated with the second coating liquid is bonded onto a fabric in a wet state, and dried and cured in a chamber at 80 to 170° C.

The fabric woven with one or more fibers selected from the group consisting of aramid fiber, oxidized polyacrylonitrile fiber, shrinkage fiber, spandex, polyester fiber, nylon, and rayon may be used. The proper fabric can be selected according to the applications. For example, aramid fiber, oxidized polyacrylonitrile fiber, shrinkage fiber and the like are used as an interior material for an aircraft or a ship, and polyester or nylon, rayon, and the like are used as an interior material for an automobile, furniture, and miscellaneous products.

And then, a synthetic leather, of which surface is coated with a silicone rubber is obtained by separating the release paper from the first coating layer. Through the fabric bonding and release paper separation processes, a double coated fabric with constructions of the fabric, the second coating layer, and the first coating layer are laminated in order is formed.

(4) Surface Treatment Process

This process is treating, with a silicone surface coating agent, the surface, which is the surface of the first coating layer, from which the release paper is separated. There would be production difficulties handling a silicone rubber with a high viscosity of 100 Pa·s or more to be used as the first coating liquid, but workability will be improved by performing surface treatment with the silicone surface coating agent as described above. Through the surface treatment process, the characteristic or textures of the synthetic leather surface could be adjusted.

(5) Upper Coating Process

This process is additional coating on top of the second coating layer of the surface-treated fabric. This is performed for the purpose of coloring or improving abrasion resistance. As the upper coating method, for example, a gravure roll coating method may be used. When the curing is performed by drying the upper coated fabric in a hot air oven at 100 to 220° C., a silicone synthetic leather may be finally produced.

By the surface treatment and upper coating processes, a silicone synthetic leather in which the fabric, the second coating layer, the first coating layer, and the upper coating layer are laminated in order is produced.

In the present invention, the curing conditions may be changed depending on the coating amount, the length of the chamber, and the like.

The synthetic leather produced as described above may be used for many applications according to the kind of fabric applied. For example, the synthetic leather may be used as an interior material for an aircraft, ship or an automobile, and could be used as a heavy duty interior material for various commercial interiors.

Hereinafter, the present invention will be described in more detail through the Examples. However, the following Examples are only illustrative for describing the present invention, and the scope of the technical spirit of the present invention is not limited thereby.

EXAMPLE 1

(1) First Coating Process

First, a silicone first coating liquid having a processing viscosity of 180 Pa·s, an elongation of 350%, and a shore hardness of 66 was produced by mixing 100 parts by weight of LCF 8500 A (Dow Corning), 100 parts by weight of LCF 8500 B (Dow Corning), 0 to 30 parts by weight of 245 Fluid (Dow Corning), and a balance pigment. And then, the first coating was performed by knife-coating an appropriate amount (50 to 200 g/m$^2$) of the first coating liquid onto a release paper.

After the first coating, the first curing and drying was performed in a hot air oven at 130° C. for 5 minutes. Through this, a release paper on which a first coating layer was formed was obtained.

(2) Second Coating Process

A second coating liquid was coated onto the first coating layer of the release paper primarily coated.

To this end, first, a silicone second coating liquid having a processing viscosity of 210 Pa·s, an elongation of 900%, and a shore hardness of 29 was produced by mixing 100 parts by weight of LCF 8400 A (Dow Corning), 100 parts by weight of LCF 8400 B (Dow Corning), 0 to 20 parts by weight of 245 Fluid (Dow Corning), and a balance pigment.

And then, the second coating was performed by coating an appropriate amount (100 to 300 g/m$^2$) of the second coating liquid onto the release paper on which the first coating liquid was coated and cured. Through this, a release paper on which the second coating layer and the first coating layer were formed was obtained.

(3) Fabric Bonding and Release Paper Separation Processes

The release paper coated with the second coating liquid was bonded onto a fabric in a wet state, and dried and cured in a hot air oven at 140° C. for 5 minutes. And then, synthetic leather of which the surface was coated with silicone rubber was obtained by separating the release paper from the first coating layer. A release paper on which the fabric, the second coating layer, and the first coating layer were laminated in order was produced.

(4) Surface Treatment Process

A surface treatment was performed on synthetic leather, from which the release paper was separated. It was performed by using a silicone surface treating agent including 100 parts by weight of SL-5060 base, 20 parts by weight of SL-5060 HD curing agent, 5 parts by weight of SL-3000 catalyst (Dow Corning), a balance 245 Fluid (Dow Corning)/IPA and a reforming agent.

COMPARATIVE EXAMPLE 1

Synthetic leather was obtained in the same manner as Example 1, except that in the first coating (release paper coating) step, a silicone first coating liquid having a processing viscosity of 25 Pa·s, an elongation of 230%, and a shore hardness of 68 was produced by mixing 100 parts by weight of LCF 8300 A (Dow Corning), 100 parts by weight of LCF 8300 B (Dow Corning), and a balance pigment.

The main components of the first coating layer and the second coating layer of each of the synthetic leathers produced in Example 1 and Comparative Example 1 are shown in the following Table 1.

TABLE 1

|  | Example 1 | Comparative Example 1 |
|---|---|---|
| First coating layer | LCF 8500 AB | LCF 8300 AB |
| Second coating layer | LCF 8400 AB | LCF 8400 AB |

Further, the physical properties of the first coating layer and the second coating layer of each of the synthetic leathers produced in Example 1 and Comparative Example 1 are shown in the following Table 2.

TABLE 2

|  | Example 1 | | | Comparative Example 1 | | |
|---|---|---|---|---|---|---|
|  | Processing viscosity (Pa·s) | Elongation (%) | Shore hardness | Processing viscosity (Pa·s) | Elongation (%) | Shore hardness |
| First coating layer | 180 | 350 | 66 | 25 | 230 | 68 |
| Second coating layer | 210 | 900 | 29 | 210 | 900 | 29 |

EXPERIMENTAL EXAMPLE

For each synthetic leather product produced in Example 1 and Comparative Example 1, durability was experimented. As a result of the experiment, in the case of the synthetic leather produced in Comparative Example 1, there occurs a problem such as bursting open of needlework during sewing, but in the case of the synthetic leather produced in Example 1, the problem did not occur.

What is claimed is:

1. A method for producing synthetic leather, the method comprising:
   (a) a first coating process of knife-coating a release paper with a first coating liquid including a first silicone rubber having a viscosity of 100 Pa·s or more, an elongation of 300% or more, and a shore A hardness of 50 or more;
   (b) a second coating process of knife-coating the release paper coated with the first coating liquid with a second coating liquid including a second silicone rubber having a viscosity of 100 Pa·s or more, an elongation of 300% or more, and a shore A hardness of less than 50;
   (c) a bonding process of bonding the release paper coated with the second coating liquid with a fabric, followed by drying and curing; and
   (d) a separation process of separating the release paper from the coated fabric bonded onto the release paper.

2. The method of claim 1, further comprising:
a surface treatment process of treating the surface of the fabric, from which the release paper is separated, with a silicone surface coating agent, after the separation process of (d).

3. The method of claim 1, wherein the fabric of (c) is woven with one or more fibers selected from the group consisting of an aramid fiber, an oxidized polyacrylonitrile fiber, a shrinkage fiber, a spandex, a polyester fiber, and a nylon.

4. A synthetic leather produced by the method of claim 1.

5. A synthetic leather produced by the method of claim 2.

6. A synthetic leather produced by the method of claim 3.

* * * * *